(12) United States Patent
Lai et al.

(10) Patent No.: US 7,298,674 B2
(45) Date of Patent: Nov. 20, 2007

(54) METHOD AND DEVICE FOR ADJUSTING A CONTROL PARAMETER OF A SERVO OF AN OPTICAL DRIVE

(75) Inventors: Yi-Lin Lai, Taipei (TW); Keng-Lon Lei, Taipei (TW); Chin-Yin Tsai, Taipei (TW)

(73) Assignee: Via Technologies, Inc., Taipei (TW)

( * ) Notice: Subject to any disclaimer, the term of this patent is extended or adjusted under 35 U.S.C. 154(b) by 542 days.

(21) Appl. No.: 10/990,669

(22) Filed: Nov. 17, 2004

(65) Prior Publication Data

US 2005/0105412 A1    May 19, 2005

Related U.S. Application Data

(60) Provisional application No. 60/520,711, filed on Nov. 17, 2003.

(51) Int. Cl.
*G11B 7/00* (2006.01)
(52) U.S. Cl. .................. 369/44.29; 369/44.32
(58) Field of Classification Search ............ None
See application file for complete search history.

(56) References Cited

U.S. PATENT DOCUMENTS 5,146,443 A * 9/1992 Iwase et al. ............ 369/44.29
5,367,513 A * 11/1994 Bates et al. ............ 369/44.29
6,157,601 A * 12/2000 Kao et al. ............... 369/44.35
6,560,173 B2 * 5/2003 Shimamura et al. ..... 369/44.29
6,611,123 B2 * 8/2003 Ono .......................... 318/632
6,906,986 B2 * 6/2005 Lee et al. ................ 369/44.36
2002/0009026 A1 * 1/2002 Shimamura et al. ..... 369/44.29
2003/0053387 A1 * 3/2003 Lee et al. ................ 369/53.18
2003/0147315 A1 * 8/2003 Iwazawa et al. ......... 369/44.32

\* cited by examiner

*Primary Examiner*—William Korzuch
*Assistant Examiner*—Peter Vincent Agustin
(74) *Attorney, Agent, or Firm*—Thomas, Kayden, Horstemeyer & Risley

(57) ABSTRACT

A method and a device for adjusting control parameters of a servo system of an optical disk drive. A first sinusoidal signal is introduced into a control loop of the servo system, while a band-pass filter is used to extract a second sinusoidal signal. Gain and/or phase variations of the control loop are derived by comparing signal parameters of both the first and second sinusoidal signals. A compensator is then employed to adjust the derived gain and/or phase variations of the control loop so as to overcome the disadvantage of system instability after a long-term working.

15 Claims, 2 Drawing Sheets

METHOD AND DEVICE FOR ADJUSTING A CONTROL PARAMETER OF A SERVO OF AN OPTICAL DRIVE

This application claims the benefit of U.S. provisional application Ser. No. 60/520,711, filed Nov. 17, 2003, the subject matter of which is incorporated herein by reference.

BACKGROUND OF THE INVENTION

1. Field of the Invention

The invention relates in general to a method and a device for adjusting a control parameter of a servo of an optical drive, and more particularly to a method and a device that introduces a sinusoidal signal into a control loop of a servo system and then obtains the gain and/or phase variations of the introduced sinusoidal signal so as to derive required parameter regarding the control loop.

2. Description of the Related Art

FIG. 1 is a block diagram showing a servo system of a conventional optical drive. An optical sensor 102 receives an optical signal reflected from a disk (not shown) and converts the reflected optical signal into an electric signal such that a pre-stage amplifier 104 manipulates the electric signal and generates a tracking error signal Te/focusing error signal Fe. The gain and phase of the processed signal Te/Fe is then compensated into a compensator 108 after the data format of the tracking error signal Te/focusing error signal Fe is converted by an ADC (Analog to Digital Converter) 106. After the compensated tracking error signal Te/focusing error signal Fe is processed by a DAC (Digital to Analog Converter) 110, a signal Tro/Foo is obtained and directed into a drive circuit 114 so as to derive a control signal T/F for controlling a position of an optical pickup 116. A laser diode (not shown) in the optical pickup 116 generates a laser beam to read/write the optical disk. The ADC 106, the compensator 108 and the DAC 110 may be integrated in an identical ASIC 112 as applications.

However, the physical property of the system may vary from the normal due to the temperature variation after a long-term working. That is, the gain and/or phase of the control loop formed by the drive circuit 114, the optical pickup 116, the optical sensor 102 and the pre-stage amplifier 104 may deviate from the normal situation and make the system unstable. This system instability may affect the disk-read/-write operations.

There are several solutions proposed for overcoming the aforementioned disadvantage in the conventional. Firstly, an additional temperature sensor is introduced into the optical disk system to sense the temperature variations. The gain variation of the control loop is then estimated according to the temperature variation. This approach, however, cannot obtain a precise gain variation, which indicates that the improvement to the system instability is quite relatively restricted. In addition, the extra component still increases the cost of the optical disk drive. Secondly, the read/write speed of the optical disk drive is decreased so as to reduce the read/write error rate. However, this solution cannot really solve the problem of gain/phase variations.

SUMMARY OF THE INVENTION

In view of this, the invention proposes a device for adjusting a control parameter of a servo system of an optical disk drive basically encompasses a sinusoidal signal generator, a band-pass filter, a compensator and a processor. The first signal parameter of the first sinusoidal signal are generated and directed from the microprocessor to the sinusoidal signal generator. Thereafter, the sinusoidal signal generator generates and feeds the first sinusoidal signal into the control loop of the servo system. After this first sinusoidal signal being processed and amplified in the control loop, the band-pass filter is used to derive a second signal parameter regarding a second sinusoidal signal. Gain and/or phase variations of the control loop can be derived in the microprocessor by comparing signal parameters of the first and second sinusoidal signals. Finally, the microprocessor may issue an adjustment signal to the compensator to adjust the gain/phase variations of the control loop such that the system instability disadvantage is easily overcome.

In the embodiment, a method is proposed for overcoming the system instability disadvantage by using the steps as follows. The first signal parameter of a first sinusoidal signal is derived firstly, while the first sinusoidal signal is generated according to the first signal parameter. After the first sinusoidal signal being processed and amplified by the control loop, a second signal parameter of a second sinusoidal signal can be derived from the control loop by using a BPF (Band-Pass Filter). An adjustment signal can be issued to adjust the gain/phase variations of the control loop according to a control parameter that is derived by comparing the signal parameter of the first sinusoidal signal with that of the second sinusoidal signal.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
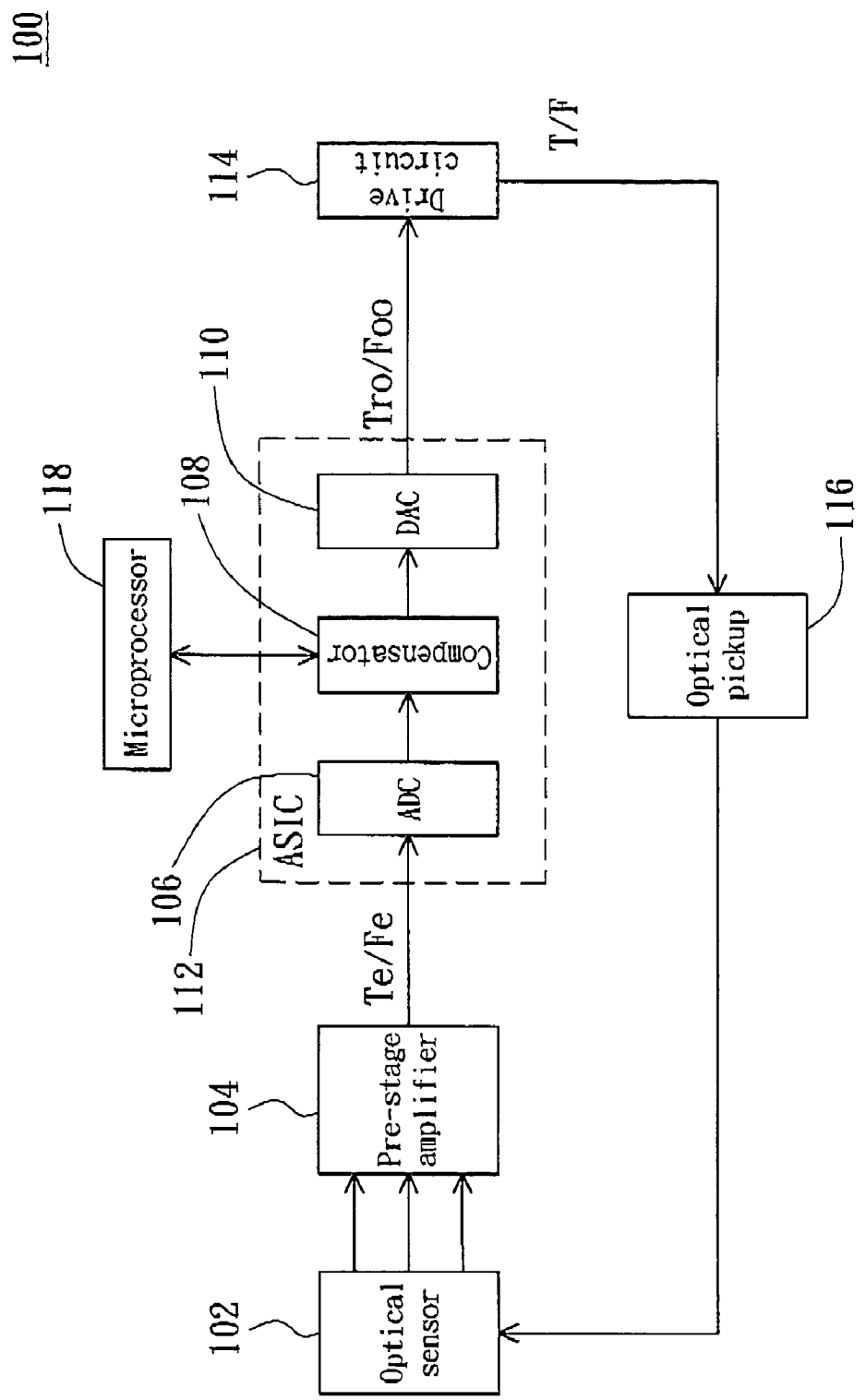
FIG. 1 is a block diagram showing a servo system of a conventional optical disk drive.
Figure 2:
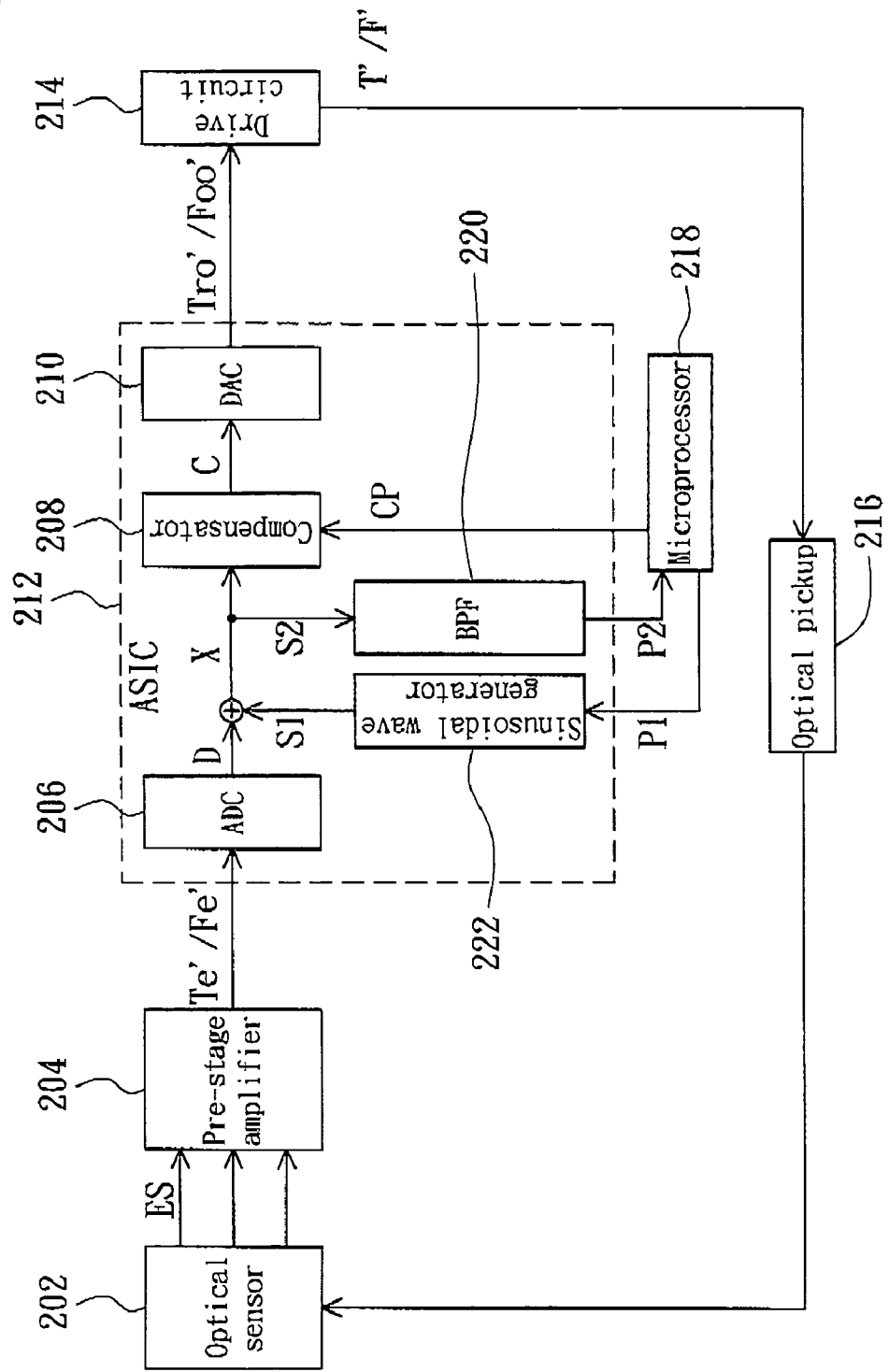
FIG. 2 is a block diagram showing a servo system of an optical disk drive according to the present invention

FIG. 2 is a block diagram showing a servo system of an optical disk drive according to a preferred embodiment of the invention. The disclosed device in the embodiment basically includes a signal generator, a digital BPF (Band-Pass Filter) 220 and a microprocessor 218. The signal generator, for example, is a sinusoidal wave generator 222 used for generating an actual sinusoidal signal according to a first signal parameter delivered from the microprocessor 218. The disclosed device is used in a control loop of a servo system of an optical drive 200, and the control loop is a close loop. The control loop is formed by an optical sensor 202, a pre-stage amplifier 204, an ADC (Analog to Digital Converter) 206, a compensator 208, a DAC (Digital to Analog Converter) 210, a drive circuit 214 and an optical pickup unit 216 as shown in FIG. 2.

The optical sensor 202 receives light reflected from a loaded disk (not shown) and converts this reflected light into an electric signal ES before directing to the pre-stage amplifier 204. The pre-stage amplifier 204 converts the electric signal ES into a first tracking error signal Te'/focusing error signal Fe', while the ADC 206 converts the first tracking error signal Te'/focusing error signal Fe' into a digital signal D. The digital signal D and the first sinusoidal signal S1 generated by the sinusoidal wave generator 222 are coupled and derived an input signal X, which is then directed to the compensator 208 and the digital BPF 220 simultaneously.

After the input signal X (which is a sum of the digital signal D and the first sinusoidal signal S1) being fed into the compensator 208, the compensator 208 adjusts the gain and the phase variations of the input signal X based on the adjustment signal Cp. The control signal C generated after the compensation is inputted to the DAC 210 so that a second tracking error signal Tro'/focusing error signal Foo' is obtained. The control signal C used for compensation is then delivered to the DAC 210 for deriving the second tracking error signal Tro'/focusing error signal Foo'. The second tracking error signal Tro'/focusing error signal Foo' is fed into the drive circuit 214, which generates a control signal T'/F' for controlling the position of the optical pickup unit 216. A laser diode (not shown) in the optical pickup unit 216 generates a laser beam being used during disk-read/-write operations. Please note that the ADC 206, the compensator 208, the DAC 210, the digital BPF 220 and the sinusoidal wave generator 222 may be integrated into the same ASIC 212. Any person having ordinary skills in the art should modify the embodiment as requirements, but all similar modifications or variations within the spirits of the embodiment should be included in the appended claims.

The compensator 208 outputs a control signal C for controlling disk-read/-write operations of the optical disk drive 200. The sinusoidal wave generator 222 generates and feeds a first sinusoidal signal S1 into the control loop according to a first signal parameter P1 delivered from the microprocessor 218, while the control loop manipulates and amplifies the first sinusoidal signal S1 to be a second sinusoidal signal S2 in a close loop manner. The digital BPF 220 is used to filter out the second sinusoidal signal S2 and derive related signal parameter P2. The microprocessor 218 computes a relationship between the second sinusoidal signal S2 and the first sinusoidal signal S1 based on their signal parameters P1 and P2 such that an adjustment signal Cp is issued to adjust a control parameter of the compensator 208. Please note that the first signal parameter P1, for example, signal period and amplitude, are generated and controlled by the microprocessor 218, which indicates that the microprocessor 218 can easily derive gain/variations of the control loop while the second signal parameter P2 is obtained. For example, if the gain/phase variations of the control loop are respectively G and Δp in comparison with the signal parameters P1 and P2, the microprocessor 218 may adjust the adjustment signal Cp to vary the control signal C derived by the compensator 208 and thus eliminate the gain/phase variations G and Δp. Please note that the gain variation may be obtained by comparing the amplitude variations indicated by the first and second signal parameters P1 and P2. The system instability disadvantage is thus easily overcome. Additionally, the band-pass filter should be designed according to the first signal parameter P1 that are controlled by the microprocessor 218 and make sure the second signal parameter P2 can be accurately derived from the control loop.

In implementations, the aforementioned adjustment signal may be derived according to a ratio of a second amplitude of the second sinusoidal signal indicated by the second signal parameter to a first amplitude of the first sinusoidal signal indicated by the first signal parameter. Moreover, the adjustment signal may be derived according to a difference between a second phase of the second sinusoidal signal indicated by the second signal parameter and a first phase of the first sinusoidal signal indicated by the first signal parameter. Similarly, the adjustment signal may be derived for changing a gain of the compensator with respect to the control signal, or changing a phase lagging value or a phase leading value of the compensator with respect to the control signal.

Consequently, the microprocessor 218 can obtain the gain and phase variations of the control loop caused by the temperature variations, or the physical property variations of system components by means of the additionally introduced first sinusoidal signal S1 after the long-term working. The invention can precisely obtain the gain and phase variations of the control loop and accurately adjust the parameter of the compensator, which indicates that the optical disk drive under the present invention is more stable than the conventional ones.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus in an optical disk drive for adjusting a control parameter in a control loop of a servo system so as to upgrade system stability after a long-term working, wherein the control loop includes a compensator for issuing a control signal for controlling disk-read/-write operations of the optical disk drive, the apparatus comprising:
    a signal generator for generating a first sinusoidal signal in response to a first signal parameter, wherein the first sinusoidal signal is delivered to the control loop and is amplified as a second sinusoidal signal;
    a digital BPF (Band-Pass Filter) for extracting the second sinusoidal signal from the control loop and for deriving a second signal parameter; and
    a microprocessor for computing a relationship between the second signal parameter and the first signal parameter so as to derive an adjustment signal such that the compensator may adjust the control signal in response to the derived adjustment signal.

2. The apparatus according to claim 1 wherein the control loop comprises:
    an optical sensor for receiving reflected light from a loaded optical disk wherein the reflected light is converted into an electric signal;
    a pre-stage amplifier for converting the electric signal into a first tracking error signal/focusing error signal;
    an ADC (Analog to Digital Converter) for converting the first tracking error signal/focusing error signal into a digital signal, which is added to the first sinusoidal signal to obtain an input signal;
    a compensator for adjusting the input signal according to the adjustment signal to generate the control signal;
    a DAC (Digital to Analog Converter) for converting the control signal into a second tracking error signal/focusing error signal;
    a drive circuit for receiving the second tracking error signal/focusing error signal; and
    an optical pickup driven by the drive circuit, wherein the optical pickup generates a laser beam projected onto the loaded disk for accessing the loaded disk.

3. The apparatus according to claim 2 further comprising an adder for adding the first sinusoidal signal to the digital signal to obtain an added signal, wherein the added signal is fed into the control loop and the digital BPF.

4. The apparatus according to claim 1 wherein the microprocessor derives the adjustment signal according to a ratio of a second amplitude of the second sinusoidal signal indicated by the second signal parameter to a first amplitude of the first sinusoidal signal indicated by the first signal parameter.

5. The apparatus according to claim 1 wherein the microprocessor derives the adjustment signal according to a difference between a second phase of the second sinusoidal signal indicated by the second signal parameter to a first phase of the first sinusoidal signal indicated by the first signal parameter.

6. The apparatus according to claim 1 wherein the compensator issues the first signal parameter to the signal generator so as to generate the first sinusoidal signal.

7. A method used in an optical disk drive for adjusting a control parameter of a servo system so as to upgrade system stability after a long-term working, wherein the control loop includes a compensator for issuing a control signal for controlling disk-read/-write operations of the optical disk drive, the method comprising:
   deriving a first sinusoidal signal according to a first signal parameter;
   feeding the first sinusoidal signal into the control loop to generate a second sinusoidal signal; and
   filtering out the second sinusoidal signal from the control loop and deriving a second signal parameter of the second sinusoidal signal;
   issuing an adjustment signal according to a comparison relationship derived between the first signal parameter and the second signal parameter such that the compensator may adjust the control signal according to the adjustment signal.

8. The method according to claim 7 wherein the adjustment signal is derived according to a ratio of a second amplitude of the second sinusoidal signal indicated by the second signal parameter to a first amplitude of the first sinusoidal signal indicated by the first signal parameter.

9. The method according to claim 7 wherein the adjustment signal is adjusted according to a difference between a second phase of the second sinusoidal signal indicated by the second signal parameter and a first phase of the first sinusoidal signal indicated by the first signal parameter.

10. The method according to claim 7 wherein the adjustment signal is used for changing a gain of the compensator with respect to the control signal, or changing a phase lagging value or a phase leading value of the compensator with respect to the control signal.

11. A servo system in an optical disk drive having capability of eliminating system instability after a long-term working, comprising:
   a signal generator for generating a first sinusoidal signal in response to a first signal parameter, wherein the first sinusoidal signal is delivered to the control loop and is amplified as a second sinusoidal signal;
   a digital BPF (Band-Pass Filter) for extracting the second sinusoidal signal from the control loop and for deriving a second signal parameter; and
   a compensator, in response to an adjustment signal for issuing a control signal for controlling disk-read/-write operations of the optical disk drive;
   wherein the adjustment signal is derived according to a comparison relationship derived between the first signal parameter and the second signal parameter.

12. The servo system according to claim 11 wherein the first signal parameter is generated by a microprocessor of the optical disk drive and the signal generator generates the first sinusoidal signal according to the first signal parameter.

13. The servo system according to claim 12 wherein the microprocessor issues the adjustment signal according to the comparison relationship derived between the first signal parameter and the second signal parameter.

14. The servo system according to claim 13 wherein the microprocessor derives the adjustment signal according to a ratio of a second amplitude of the second sinusoidal signal indicated by the second signal parameter to a first amplitude of the first sinusoidal signal indicated by the first signal parameter.

15. The servo system according to claim 13 wherein the microprocessor derives the adjustment signal according to a difference between a second phase of the second sinusoidal signal indicated by the second signal parameter to a first phase of the first sinusoidal signal indicated by the first signal parameter.

* * * * *